United States Patent [19]

Smith et al.

[11] Patent Number: 5,050,958

[45] Date of Patent: Sep. 24, 1991

[54] OPTICAL FIBRE CABLE

[75] Inventors: Lawrence I. Smith; Philip A. O'Bow-Hove, both of London, England

[73] Assignee: Telephone Cables Limited, England

[21] Appl. No.: 486,068

[22] Filed: Feb. 28, 1990

[30] Foreign Application Priority Data

Mar. 6, 1989 [GB] United Kingdom ............... 8905056

[51] Int. Cl.⁵ .............................................. G02B 6/44
[52] U.S. Cl. .................................................... 385/102
[58] Field of Search ............... 350/96.20, 96.21, 96.22, 350/96.23

[56] References Cited

U.S. PATENT DOCUMENTS

| | | | |
|---|---|---|---|
| 3,710,006 | 1/1973 | Davis | 350/96.23 X |
| 4,093,342 | 6/1978 | Foord et al. | 350/96.23 |
| 4,365,865 | 12/1982 | Stiles | 350/96.23 |
| 4,371,234 | 2/1983 | Parfree et al. | 350/96.23 |
| 4,389,088 | 6/1983 | Trezequet | 350/96.23 |
| 4,730,894 | 3/1988 | Arroyo | 350/96.23 |
| 4,907,855 | 3/1990 | Oestreich | 350/96.23 |
| 4,913,516 | 4/1990 | Ikeda | 350/96.23 |
| 4,971,420 | 11/1990 | Smith | 350/96.23 |

FOREIGN PATENT DOCUMENTS

| | | | |
|---|---|---|---|
| 0203538 | 12/1986 | European Pat. Off. | 350/96.23 |
| 2064163 | 6/1981 | United Kingdom | 350/96.23 |
| 2213958 | 8/1989 | United Kingdom | 350/96.23 |

Primary Examiner—Akm Ullah
Assistant Examiner—Phan T. Heartney
Attorney, Agent, or Firm—Kirschstein, Ottinger, Israel & Schiffmiller

[57] ABSTRACT

An optical fibre cable comprising a generally non-metallic central core encased in a rigid metallic tube, at least one layer of longitudinal strength members which, or the inner one of which, overlays and is in contact with the rigid metallic tube, and a sheath overlaying the strength member layer, the layer of strength members including, in a respective gap or gaps, at least one longitudinally-welded metallic tube within which is encased at least one optical fibre.

11 Claims, 1 Drawing Sheet

OPTICAL FIBRE CABLE

BACKGROUND OF THE INVENTION

1. Field of the Invention

This invention relates to optical fibre cables, and especially to such cables to be used in underwater applications.

2. Description of Related Art

Underwater cables are required to have high strength and be resistant to high pressures, the action of the sea and damage from vessels. Conventionally, such cables are constructed with a fibre package protected by a seamless metal tube and layers of armouring wires. The metallic elements are insulated and protected by a thick polythene sheath. Where repeaters are needed, the power to the repeaters is supplied from the metallic elements. If the polythene sheath is damaged, there is a risk of the metallic elements being earthed. Thus, in order to provide satisfactory insulation of the wires, a thick sheath is used to encase the cable. The combined effect of the armouring wires and sheath is to produce a heavy and unwieldy cable.

It is an object of this invention to provide a cable which is smaller and lighter than conventional cables, whilst ensuring that there is no additional risk of earthing the metallic elements or of damage to the optical fibres. a central cylindrical core, a layer of strength members at least one of which is replaced in the same layer by a laser-welded metallic tube within which is encased at least one optical fibre, the layer overlaying the surface of the core, and sheathing means overlaying the first layer of strength members.

The example described in said U.K. application is illustrated in FIG. 1 of the instant drawings. Briefly, a central copper conductor 1 is surrounded by a layer of low density polythene which constitutes an inner sheath 3. A first layer of high tensile steel wires 6 is wound helically about the inner sheath 3, a number of optical fibres or fibre ribbons 5 encased in laser-welded stainless steel tubes 7 being interspersed between the wires 6. The steel tubes 7 and the wires 6 have the same diameter.

A second layer of high tensile steel wires 11 is wound helically around the first layer in the opposite direction with a quantity of silicone water blocking compound 9 between the layers. The cable is encased in an outer sheath 13 formed of medium density polythene.

The stainless steel tubes 7 protect the respective optical fibres 5 from damage; each tube replaces an armouring wire. Thus there is no need for a separate optical fibre package within the cable, enabling a lighter and more compact cable to be produced.

Typically, stainless steel tubes of 1 mm to 6 mm diameter are used. These are filled with thixotropic grease and laser welded longitudinally to enclose the optical fibre. The tubes provide moderately hard, hermetically sealed fibre packages.

The lay length of the helical first layer may be varied depending on the fibre strain relief required in the cable.

It is necessary to minimise torsional resistance in the cable, for ease of coiling the cable. Torsional effects in the core can be compensated for by an appropriate selection of diameter and lay length and lay direction of the helical strength member layer or layers but render the torsional behaviour especially susceptible to any change in the number of strength members employed. Cable designs can be required with different tube counts, so it is desirable to have the freedom to vary the number of tubes replacing strength members in a layer, without affecting torsional performance significantly.

The core of the cable can be made relatively soft in order to minimise its torsional resistance, but it then fails to provide sufficient radial reaction by way of support to the strength member layer or layers.

SUMMARY OF THE INVENTION

Accordingly, the invention provides an optical fibre cable comprising a generally non-metallic central core encased in a rigid metallic tube, at least one layer of longitudinal strength members which, or the inner one of which, overlays and is in contact with the rigid metallic tube, and sheathing means surrounding the strength member layer, the layer of strength members including, in a respective gap or gaps, at least one longitudinally-welded, preferably laser-welded, metallic tube within which is encased at least one optical fibre. For ease of manufacture, the non-metallic central core may incorporate a central kingwire of optionally electrically conductive material.

The or each longitudinally-welded tube is preferably part of an outer layer of two layers of longitudinal strength members. The strength members, or strength members and tubes, of the or each layer are preferably of uniform diameter; where there are two layers, the diameter of those in the outer layer is preferably less than that of those in the inner layer.

Preferably, where there are two layers of strength members, they are wound helically in opposite directions, for cancellation of the torsional effects. Similar or limited torsional effects are however envisaged with unilay strength member layers that lock.

Conveniently, there is a water blocking compound between the two layers of strength members and a water-blocking compound between the optical fibres and the laser welded tube. This compound in the laser welded tubes may be a thixotropic grease.

The strength members are preferably metal wires, e.g. of steel.

It will be understood that the strength members provide at least the major part of the longitudinal strength of the cable, preferably at least 75%, this being spread substantially uniformly around the cable core.

The rigid metallic tube, which is preferably formed from tape, has the important function of supporting the strength members by transmitting a radial reaction force; its outer surface is preferably cylindrical, and the strength members are preferably also cylindrical. The metallic elements within the cable either individually or collectively preferably provide a power conducting path.

In some cases a substantially rigid tube, for example of plastics material or metal may be interposed between the strength member layer or layers and the surrounding sheathing means. Alternatively a high modulus whipping material, such as aramid polymer yarn, may be provided around the strength member layer or layers beneath the sheathing means.

BRIEF DESCRIPTION OF THE DRAWINGS

One embodiment of the invention will now be described, by way of example only, with reference to the accompanying diagrammatic drawings, in which.

DETAILED DESCRIPTION OF THE PREFERRED EMBODIMENTS

Figure 1:
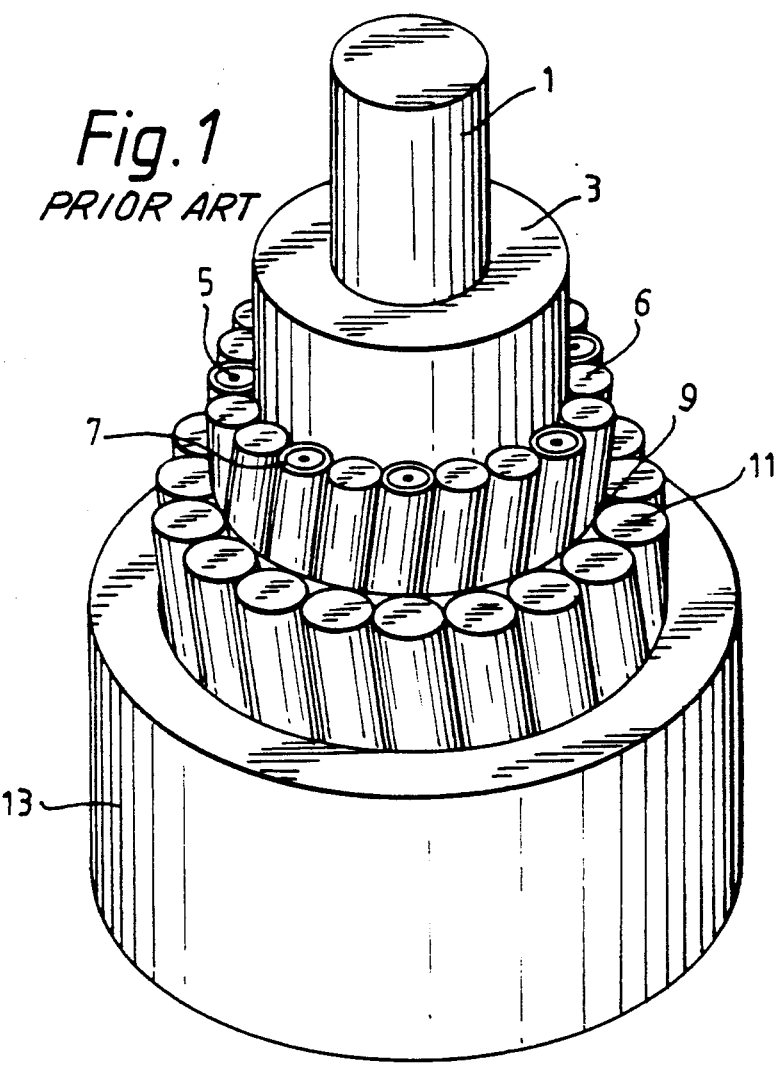
FIG. 1, to which reference has already been made, is a perspective view of a section of optical fibre cable in accordance with the prior art, namely, our co-pending U.K. Patent Application No. 8828192.8 (Publication No. 2213958A), with successive layers partially broken away to reveal its structure.
Figure 2:
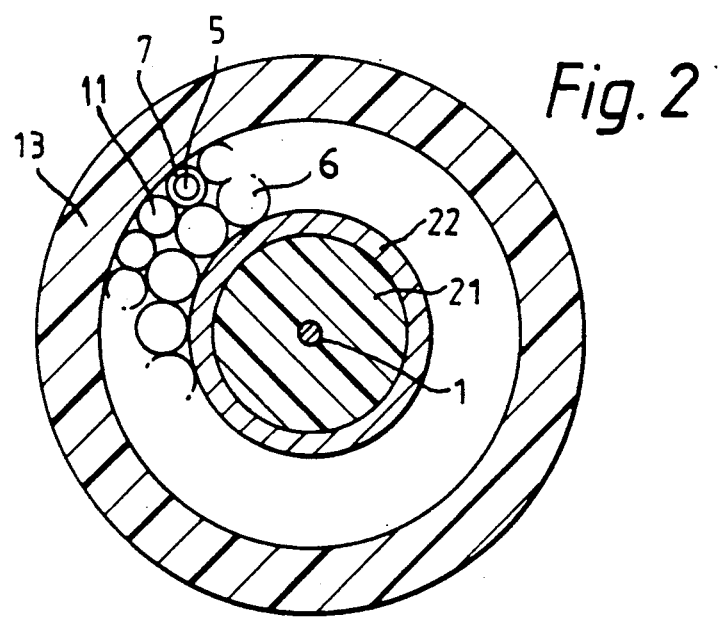
FIG. 2 is a cross-section through an optical fibre cable embodying the present invention; in which corresponding elements are given identical reference numerals.

The cable of FIG. 2 differs from that of FIG. 1 in that the laser-welded tubes 7 containing optical fibres 5 lie in the outer layer of strength members 11 rather than in the inner layer 6, and in that the core consists of a kingwire 1 embedded in a rigid, but relatively soft, plastics centre 21 encased in a rigid, cylindrical tube 22 formed from one or more metallic tapes folded longitudinally around, or wound in a helical fashion around, the plastics centre 21. The sheath 13 is of polythene. In this example, the strength members 6 of the inner layer contact the metallic tube 22 and the strength members 11 and tubes 7 of the outer layer. The lay of the helically-wound inner layer is opposite in direction to that of the helically-wound outer layer. Each longitudinal member, 6, 7 or 11, is in contact with two others of the same layer, along two parallel helices.

As in the case of the cable illustrated in FIG. 1, the laser-welded metal tubes 7 are formed of stainless steel, and they preferably have a wall thickness of between 0.05 mm and 0.50 mm.

In a modification of the cable illustrated in FIG. 2, a rigid plastics or metal tube is interposed between the outer layer, formed by the strength members 11 and tubes 7, and the sheath 13. Alternatively a high modulus whipping material, may be wound around the outer layer so as to lie beneath the sheath 13.

We claim:

1. An optical fibre cable for underwater use and having a tensile strength, comprising:
   (a) a generally non-metallic central core;
   (b) a rigid metallic tube encasing the core;
   (c) an assembly of longitudinal, non-central, tensile strength members surrounding the metallic tube and including at least one layer of said strength members contacting and supported by the metallic tube, said at least one layer including a plurality of said strength members having interspersed among them at least one longitudinally-welded metallic tube within which is encased at least one optical fibre, said assembly of strength members together having a combined tensile strength that is a major part of the tensile strength of the cable; and
   (d) sheathing means surrounding the assembly of strength members.

2. A cable according to claim 1, in which said at least one longitudinally-welded tube is laser-welded.

3. A cable according to claim 1 wherein the assembly of longitudinal strength members comprises an inner and an outer layer, and wherein said at least one longitudinally-welded metallic tube is located between respective adjacent members of the outer layer.

4. A cable according to claim 1, wherein the longitudinal strength members of said at least one layer of strength members, and said at least one longitudinally-welded metallic tube between adjacent members of said at least one layer, are of uniform diameter.

5. A cable according to claim 3, wherein the longitudinal strength members of the outer layer, and said at least one longitudinally-welded metallic tube between respective adjacent members of said outer layer, each have a diameter less than each diameter of the longitudinal strength members of the inner layer.

6. A cable according to claim 1 in which the longitudinal strength members are helically wound metal wires.

7. A cable according to claim 1, in which a substantially rigid tube is interposed between the assembly of longitudinal strength members and the surrounding sheathing means.

8. A cable according to claim 7, wherein the substantially rigid tube is formed of a plastics material or metal.

9. A cable according to claim 1, incorporating high modulus whipping material wound around the assembly of longitudinal strength members so as to lie beneath sheathing means.

10. A cable according to claim 1, wherein the sheathing means comprises an extruded thermoplastics material.

11. A cable according to claim 1, wherein the strength members provide at least 75% of the tensile strength of the cable, which is spread uniformly around the central core.

* * * * *